July 12, 1927.
A. L. SCHRAM
1,635,439
REENFORCED PLUNGER AND METHOD OF MAKING SAME
Filed June 14, 1926
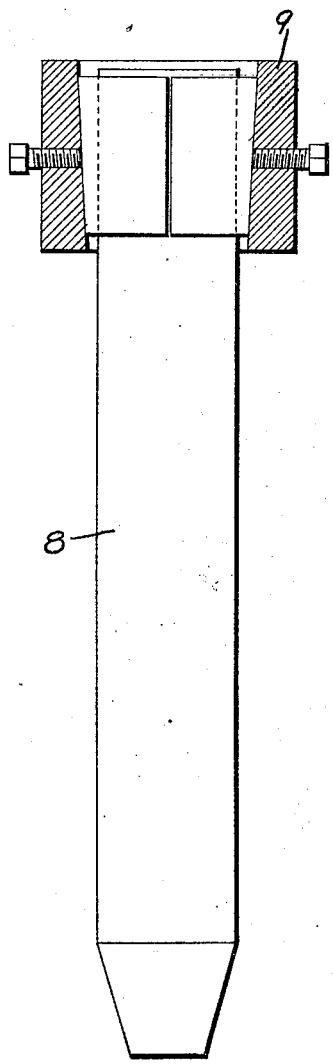
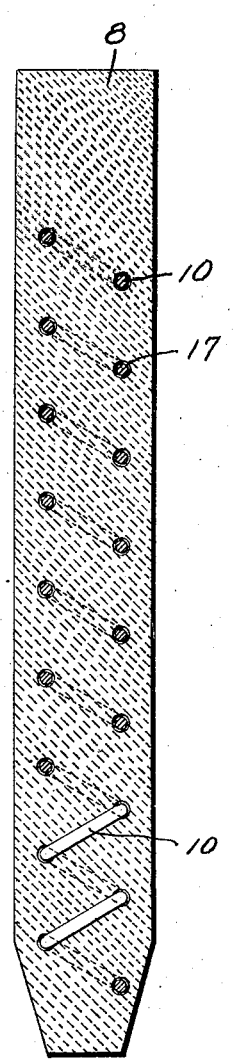
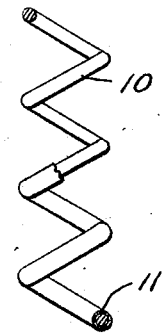
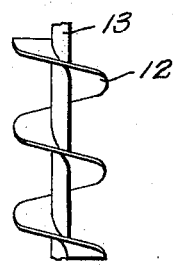
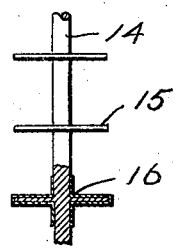
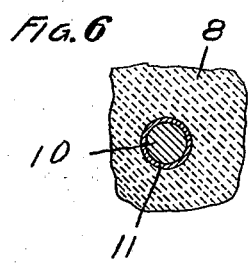
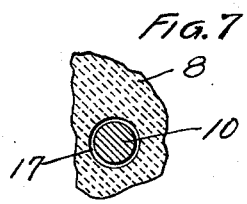
INVENTOR
ALEXANDER L. SCHRAM
By Edward E. Longan
ATTY.

Patented July 12, 1927.

1,635,439

UNITED STATES PATENT OFFICE.

ALEXANDER L. SCHRAM, OF HILLSBORO, ILLINOIS, ASSIGNOR TO BALL BROTHERS COMPANY, OF MUNCIE, INDIANA, A CORPORATION OF INDIANA.

REENFORCED PLUNGER AND METHOD OF MAKING SAME.

Application filed June 14, 1926. Serial No. 115,871.

My invention relates to improvements in reenforced plungers and method of making same, and has for its primary object a plunger for glass furnaces which is reenforced in such a manner that the danger of the same breaking is materially lessened.

A further object is to construct a plunger for glass furnaces which is reenforced in such a manner that in the event of the plunger breaking, the parts will not separate and a portion thereof drop into the molten glass.

A still further object is the method of making reenforced plungers in which a metallic reenforcement is placed in the interior of a plunger and in such a manner that a space is provided around the reenforcement so that it can expand under the heat without danger of cracking or ruining the plunger.

Heretofore in glass furnaces, the plunger was constructed of a solid clay body and it quite frequently happened that the plunger would break, the lower part thereof falling into the furnace. It was then necessary to open up the furnace and fish out the broken end of the plunger before the operation of the furnace could again be resumed. This consumed a great length of time because the glass forming machine would have to be stopped, the boot opened up, the plunger mechanism moved out of the way, and then considerable time would be lost fishing around in the molten glass with tongs to retrieve the broken end, all of this usually requiring about one hour. During this time the glass in the boot became chilled to such an extent that it would not make commercial ware and there would be at least another half hour lost restoring the glass to its proper temperature so that commercial ware could again be made; thus a broken plunger would mean the loss of at least an hour and a half in the production of commercial ware together with the loss of time of the operators of the machine.

With my improved plug this is obviated because the reenforcement is so constructed that should the plug break, it will not fall downward into the glass furnace or boot and it can be readily removed in its entirety and a new plug placed in position without interrupting the flow of glass from the boot and in a very short period of time.

In the drawings:

Fig. 1 is a side view of my plunger showing the same secured in the harness;

Fig. 2 is a vertical longitudinal section of the plunger showing the reenforcement in position;

Fig. 3 is a fragmental view of one form of the reenforcement, a portion thereof having a coating thereon;

Fig. 4 is a fragmental view of another form of reenforcement;

Fig. 5 is another form of reenforcement with a portion thereof in section showing the coating;

Fig. 6 is an enlarged fragmental view of a portion of a plunger when first molded showing the coating surrounding the reenforcement; and Fig. 7 is a similar view showing the plunger after the same has been heated and the coating destroyed bringing out the expansion space around the reenforcing member.

In the construction of my device I employ a plug 8. This plug is adapted to have its upward end secured in the harness 9 by any well-known means, one form of which is illustrated in Fig. 1. The plunger is formed of fire clay or other refractory material and has imbedded therein a reenforcing member 10. This reenforcing member is preferably in the form of a coil similar to a coil spring although other forms may be used. The reenforcing member 10 is preferably formed of cast iron as it will not change its shape under heat like wrought iron or steel. In other words, cast iron will not become malleable when subjected to heat. The reenforcement is provided with a coating 11. This coating may be of various materials, one way to apply this coating being to dip the reenforced member in an adhesive and then roll it in sawdust, or it may be coated with paraffine or some other material, which when heated will melt and be absorbed by the body of the plunger. This coating is made sufficiently thick to take care of the expansion of the reenforcing member when the plunger is in use as it becomes intensely heated and, if a space were not supplied around the reenforcement to take care of this expansion, there would be a tendency to crack the plunger because there would be no way in which this expansion could be absorbed.

It will be noted particularly that the reenforcement not only extends vertically in the plunger but also laterally so that should the plunger crack at any point, it will always have a support below the crack to prevent the two parts from separating.

In Fig. 4 I have illustrated a reenforcing member 12 which is in the form of a helix around a central core 13 making it similar to a screw conveyor. If desired, however, the core 13 can be omitted entirely. In Fig. 5 I have shown still another form of reenforcement in which a central core 14 is employed, which has a plurality of disks 15 surrounding it, the disks 15 being spaced apart from each other. The disks 15 and core 12 are provided with a coating 16. It is my intention also, if the form shown in Fig. 4 is used, to give it a coating.

In manufacturing my plunger it is made in the usual manner, that is it is first molded in halves and while plastic the two halves are brought together and firmly adhere to each other. With my construction the reenforcing member is placed in one of the halves in such a manner that its outer edges will not extend through the edge of the finished plunger. The clay is then placed in position in that half of the mold so that the reenforcing member will be imbedded halfway, the other half of the plunger is then formed over this half and, when the clay has set sufficiently, the mold is removed and the plunger dried and then placed in a kiln for burning. Of course previous to placing the reenforcement in the clay, it has been provided with its coating as before described.

The plunger previous to use is placed in an oven where it is heated so that it will not chill the glass when placed in position and also to eliminate any possibility of the plunger being shattered when introduced into the molten glass because in that instance the change in temperature would be extreme and the rapid expansion cause the plunger to shatter. During this preliminary heating the coating around the reenforcement is destroyed. In the event sawdust is used, it is consumed or burnt up and when paraffine or similar material is used, it will melt and be absorbed into the plunger or rather that part immediately surrounding the reenforcement. At all events after the plunger has been heated, a space 17 surrounds the reenforcement. It is essential, of course, that the coating be of such material that it will be destroyed long before any appreciable expansion takes place in the reenforcement so that when this occurs, there will be sufficient space for the reenforcement to expand and not exert any thrust whatever on the material of which the plunger is composed. It will be noted that the reenforcement is to be completely covered with this coating so that expansion can take place in all directions. It is also preferable to make this coating of such a thickness that when the fullest expansion of the reenforcing member has taken place, it will just fit snugly within the space left after the destruction of the coating.

I have also discovered that it very frequently happens on account of the viscosity of the glass that when the plunger is raised, the glass will be sufficiently stiff to tear apart the ordinary plunger thus causing the one part to remain in the glass and necessitating the removal as before described. By the use of my reenforcement however, this tearing apart of the plunger is entirely obviated since the reenforcement will prevent this.

Having fully described my invention, what I claim is:—

1. A plunger for glass furnaces comprising a reenforcing member, a destructible coating surrounding said reenforcing member, and a relatively thick clay body entirely surrounding said reenforcing member and coating.

2. The method of making reenforced plungers which consists in covering a metallic reenforcing member with a destructible coating, surrounding said reenforcement with a body of plastic refractory material, and then heating said plunger so as to destroy said coating.

3. The method of making reenforced plungers which consists in covering a metallic reenforcing member with a destructible coating of sufficient thickness to compensate for the expansion of said reenforcement when subjected to heat, surrounding said coated reenforcement with a body of plastic refractory material, drying said plunger thus formed, and lastly heating said plunger so as to destroy said coating.

In testimony whereof I have affixed my signature.

ALEXANDER L. SCHRAM.